Figure 1:
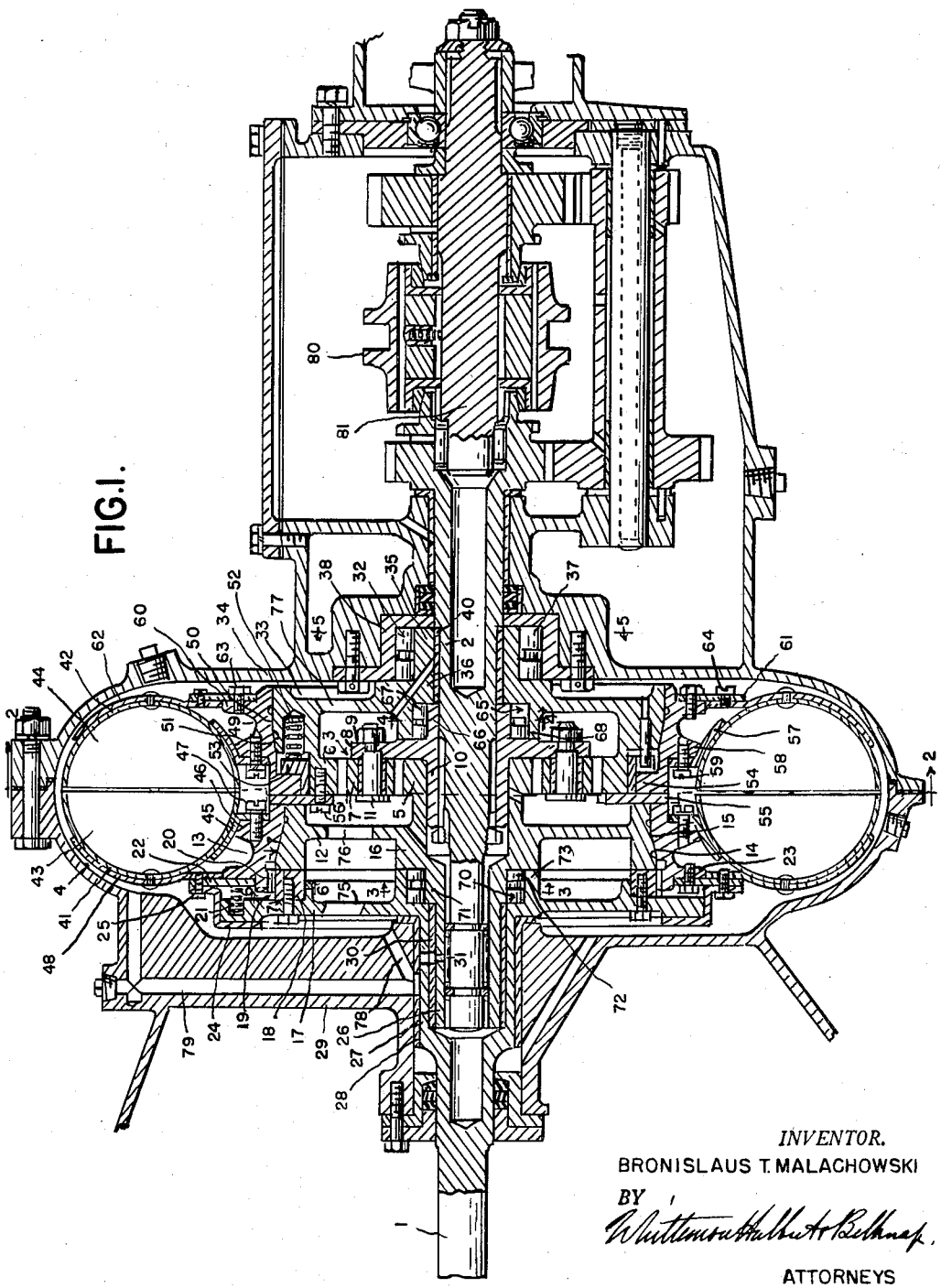
Figure 2:
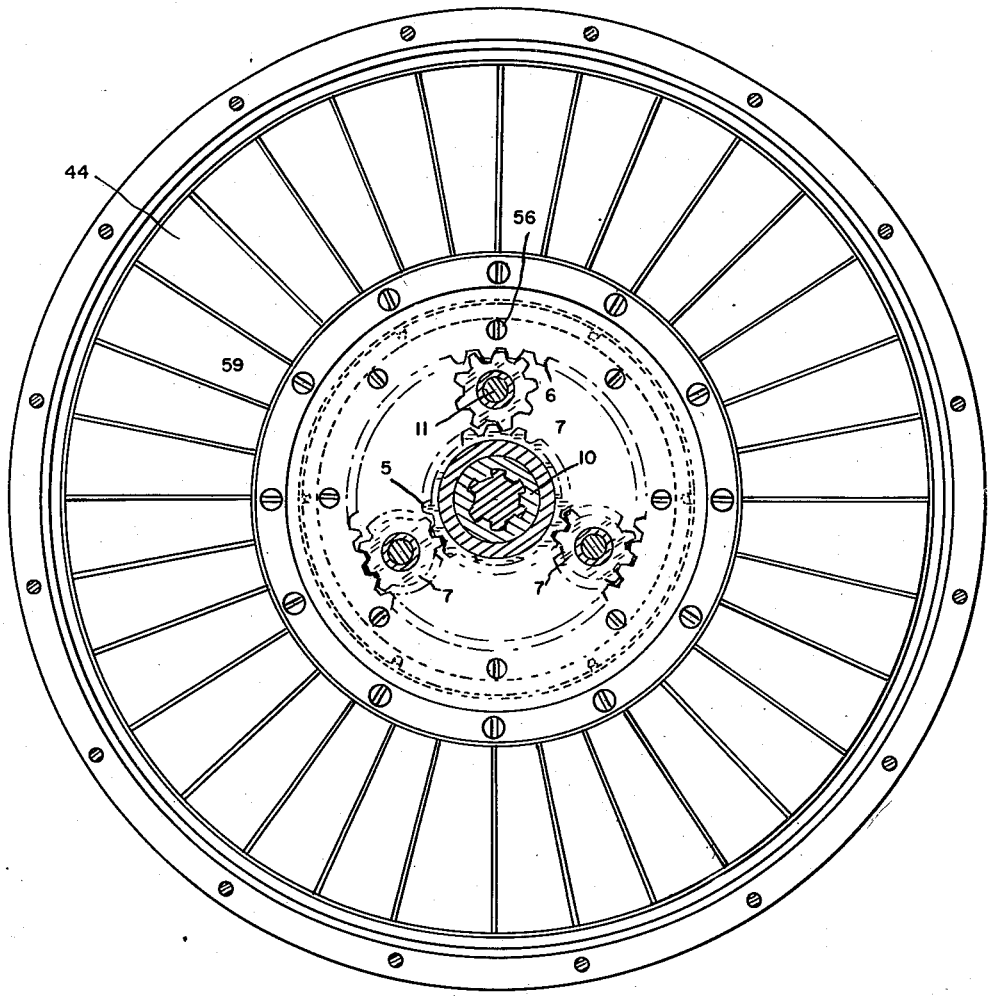
Figure 3:
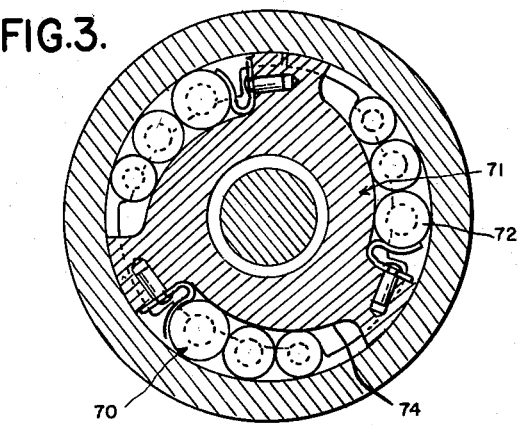
Figure 4:
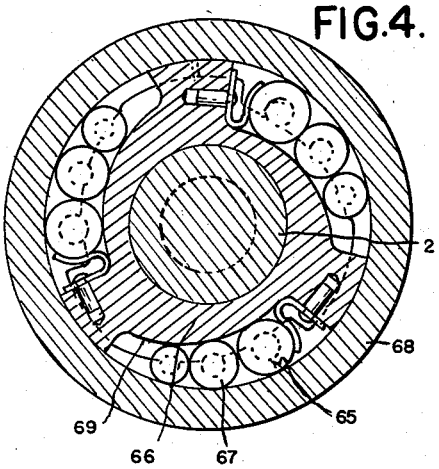
Figure 5:
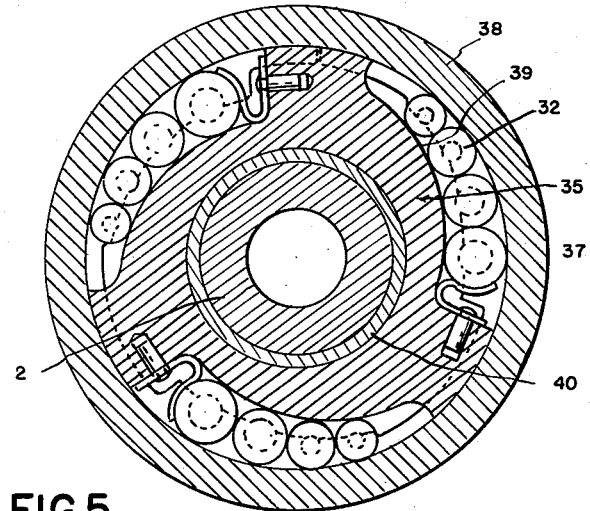

Oct. 9, 1951 — B. T. MALACHOWSKI — 2,570,467
TRANSMISSION
Filed Feb. 3, 1947 — 3 Sheets-Sheet 1

INVENTOR.
BRONISLAUS T. MALACHOWSKI
BY
ATTORNEYS

Oct. 9, 1951   B. T. MALACHOWSKI   2,570,467
TRANSMISSION

Filed Feb. 3, 1947   3 Sheets-Sheet 2

INVENTOR.
BRONISLAUS T. MALACHOWSKI
BY

ATTORNEYS

Oct. 9, 1951     B. T. MALACHOWSKI     2,570,467
TRANSMISSION
Filed Feb. 3, 1947     3 Sheets-Sheet 3

INVENTOR.
BRONISLAUS T. MALACHOWSKI
BY
ATTORNEYS

Patented Oct. 9, 1951

2,570,467

UNITED STATES PATENT OFFICE 2,570,467

TRANSMISSION

Bronislaus T. Malachowski, Detroit, Mich.

Application February 3, 1947, Serial No. 726,033

1 Claim. (Cl. 74—688)

The invention relates to transmissions and refers more particularly to automatic transmissions for driving a driven shaft at various speeds from a drive shaft.

The invention has for one of its objects to provide an improved transmission which is constructed to drive a driven shaft through a relatively wide range of speeds.

The invention has for another object to provide an improved transmission which is constructed to positively drive the driven shaft at one speed and to drive the driven shaft by means of a fluid coupling at higher speeds.

The invention has for a further object to provide an improved transmission having means for holding the driven shaft from rotation in the direction of rotation of the drive shaft at a faster rate than that of the drive shaft.

The invention has for further objects to provide an improved transmission having an automatically operable clutch between the drive shaft and epicyclic gearing of the transmission to drive the latter from the former and to provide an improved transmission having clutches for coupling the drive shaft to one of the external and internal gears of the epicyclic gearing and to a fluid coupling and for also coupling the fluid coupling to the other of the external and internal gears to effect driving of the driven shaft at a progressively increasing rate.

With these as well as other objects in view, the invention resides in the novel features of construction and combinations and arrangements of parts as more fully hereinafter set forth.

Figure 7:
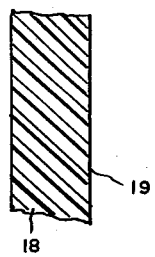
Figure 6:
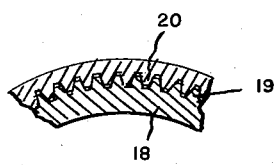

In the drawings:

Figure 1 is a longitudinal section through a transmission embodying the invention;

Figures 2, 3, 4, 5 and 6 are cross sections on the lines 2—2, 3—3, 4—4, 5—5 and 6—6 of Figure 1; and Figure 7 is an edge elevation of one of the members shown in Figure 6.

The transmission, as illustrated in the present instance, is particularly adapted for use in motor vehicles and comprises the drive shaft 1, the axially aligned driven shaft 2 and mechanism between the two shafts comprising the epicyclic gearing 3 and the fluid coupling 4 for driving the driven shaft from the drive shaft through a relatively wide range of speeds in a smooth uninterrupted manner.

The epicyclic gearing 3 comprises the external or sun gear 5, the internal gear 6 and the planetary gears or pinions 7 between and in mesh with the external and internal gears. The planetary gears are mounted on the carrier 8 having the radial flange 9 and the hub 10 which latter encircles and is secured to the driven shaft 2 as by being splined thereto. Each planetary gear 7 is journalled on the shouldered pin 11 which extends transversely of and is fixedly secured to the radial flange 9.

For driving the external gear 5 by the drive shaft, clutch mechanism is provided between the two. This clutch mechanism comprises the front internal and external cone clutch members 12 and 13, respectively, having the external and internal conical friction faces 14 and 15, respectively. The external gear 5 is rotatable with the front internal cone clutch member 12 and is located at the rear end of the hub 16 of the internal cone clutch member and is preferably integral therewith. The external cone clutch member 13 is movable axially forwardly from an inoperative position with the friction faces 14 and 15 out of driving engagement to an operative position with the friction faces in driving engagement and to accomplish the forward axial movement the drive shaft 1 is provided at its rear end with the radial flange 17 to which is fixedly secured the actuating ring 18. The actuating ring 18 has the external teeth 19 arranged at an angle of substantially 45° to the axis of the drive shaft and the external cone clutch member 15 has the correspondingly inclined internal teeth 20 in mesh with the external teeth 19. The angle of the teeth is such that upon rotation of the drive shaft 1 in a clockwise direction looking from in front of the transmission, the external cone clutch member is moved axially forward to bring its internal friction face 15 into firm frictional engagement with the external friction face 14 of the internal cone clutch member to drive the latter.

The external cone clutch member 15 is resiliently urged axially in a rearward direction by means of the annular series of axially extending coil springs 21 which abut the drive shaft flange 17 and the annular plate 22, the latter abutting the front side of the radial flange 23 of the external cone clutch member. To limit the rearward axial movement of the external cone clutch member under the action of the coil springs there is the annular stop 24 secured to the plate 22 by the cap bolts 25 and extending over and abutting the front side of the flange 17.

The hub 16 of the internal cone clutch member 12 has the reduced portion 26 which extends axially forwardly within the enlarged rearward portion 27 of the drive shaft 1. The driven shaft 2 extends within the reduced hub portion 26. A suitable bearing 28 is provided between the enlarged rear end portion 27 and the section 29 of the transmission housing. Also suitable bearings 30 and 31 are provided between the enlarged rear end portion 27 and the reduced hub portion 26 and between the reduced hub portion 26 and the driven shaft 2 respectively.

To prevent rotation of the internal gear 6 in a counter clockwise direction looking from in front of the transmission so that the drive shaft 1 can positively drive the driven shaft 2, the roller one-way brake mechanism 32 is provided between the rear member 33 which rotates with the internal gear as a unit and the section 34 of the transmission housing. The roller one-way brake mechanism comprises the axially rearwardly extending portion 35 of the hub 36 of the rear member, the rollers 37 and the ring 38 fixedly secured to the housing section 34. The hub portion 35 has the external cam faces 39 engageable with the rollers and the ring 38 has a cylindrical internal face concentric with the driven shaft 2 and also engageable with the rollers. A suitable bearing 40 is located between the hub 36 and the driven shaft 2.

The fluid coupling 4 comprises the opposed annular drive and driven sections 41 and 42 respectively, each being, as shown, of semi-circular cross section and opening toward the other. The drive and driven sections are provided with the substantially radial fins 43 and 44 respectively, the number of the former being preferably greater than the number of the latter. The drive section 41 is fixedly secured to the front external cone clutch member 13 by the bracket 45 which is welded to the section and secured to the radial flange 46 of the external cone clutch member by the cap bolts 47. The front section is also connected to the plate 22 and stop 24 by the bracket 48 riveted to the drive section and secured to the plate and stop by the cap bolts 25.

For driving the internal gear 6 in a clockwise direction by the fluid coupling 4 and more particularly its driven section 42, clutch mechanism is provided. This clutch mechanism comprises the rear member 33 and the rear external cone clutch member 49, the rear member forming a rear cone clutch member with the internal gear at its front end and preferably integral therewith. The rear external and internal cone clutch members have the external and internal concentric friction faces 50 and 51 respectively. The rear external cone clutch member is axially movable rearwardly relative to the rear internal cone clutch member from an inoperative position in which the friction faces are out of driving engagement to an operative position in which they firmly engage each other or are in driving engagement. To resiliently hold the external cone clutch member in its forward position with clearance between the friction faces there are the annular series of axially extending coil springs 52 abutting the internal cone clutch member and the ring 53 which latter has a radially outwardly extending flange abutting the rear face of the radially inwardly extending annular projection 54 of the external cone clutch member. 55 is a stop in the nature of a plate fixedly secured to the front side of the internal cone clutch member by the cap screws 56 and adapted to be abutted by the ring 53 to limit the forward axial movement of the external cone clutch member under the action of the coil springs 52. The driven section 42 of the fluid coupling is fixedly secured to the rear external cone clutch member 49 by the bracket 57 which is welded to the driven section and secured to the radial flange 58 of the external cone clutch member by the cap bolts 59. The driven section is also connected to the radial flange 60 of the rear external cone clutch member by the annular plate 61 and the bracket 62, the former being secured to the flange by the cap bolts 63 and the latter being riveted to the driven section and secured to the plate by the cap bolts 64.

To prevent overrunning of the driven shaft 2 relative to the drive shaft 1 in a clockwise direction looking from in front of the transmission, or in other words, to prevent rotation of the driven shaft at a faster rate than the drive shaft in a clockwise direction looking from in front of the transmission, the roller clutch mechanisms 65 and 70 are provided.

The roller clutch mechanism 65 is located between the rear internal cone clutch member 33 and the planetary gear carrier 8 and comprises the axially rearwardly extending portion 66 of the carrier hub 10, the rollers 67 and the axially forwardly extending portion 68 of the hub 36 of the rear internal cone clutch member. The hub portion 66 has the external cam faces 69 engageable with the rollers, and the hub portion 68 has a cylindrical internal face concentric with the carrier hub and the driven shaft and also engageable with the rollers. This roller clutch mechanism prevents overrunning of the rear internal cone clutch member in a clockwise direction looking from in front of the transmission relative to the carrier and the driven shaft, or in other words, prevents rotation of the rear internal cone clutch member at a faster rate than the planetary gear carrier and the driven shaft in a clockwise direction looking from in front of the transmission.

The roller clutch mechanism 70 is located between the external or sun gear 5 and the drive shaft 1, and comprises the portion 71 of the hub 16 in rear of the reduced portion 26, the rollers 72 and the axially rearwardly extending flange 73 upon the radial flange 17 of the drive shaft. The hub portion 71 has the external cam faces 74 engageable with the rollers and the flange 73 has a cylindrical internal face concentric with the drive shaft and the driven shaft and also engageable with the rollers. The roller clutch mechanism 70 prevents overrunning of the external or sun gear 5 in a clockwise direction looking from in front of the transmission relative to the drive shaft or, in other words, prevents rotation of the external or sun gear at a faster rate than the drive shaft in a clockwise direction looking from in front of the transmission.

The radial flange 17, the web of the front internal cone clutch member 12 and the web of the rear internal cone clutch member 33 are provided with annular series of holes 75, 76 and 77 respectively through which the transmission liquid passes to the fluid coupling 4 when the latter is in operation. The housing section 29 is formed with the passage 78 and 79 leading from the central and peripheral portions, respectively, of the interior of the transmission housing to the bearing 28 to assure lubrication of the bearing by the transmission liquid at all times.

With the construction as thus far described and assuming the parts to be stationary, it will be seen that upon rotation of the drive shaft 1 in a clockwise direction looking from in front of the transmission, the actuating member 18 rotates the front external cone clutch member 13 and the drive section 41 of the fluid coupling in the inoperative position of the front external cone clutch member until the resistance to rotation exerted mainly by the drive section by reason of its inertia and the inertia of the transmission liquid overcomes the effort exerted by the coil springs 21 after which the actuating member 18 in addition to rotating the front external cone clutch member moves it axially forwardly to its operative position. The front external cone clutch member then rotates the front internal cone clutch member 12 and the sun gear 5 and this sun gear through the planetary gears 7 and the carrier 8 rotates the driven shaft in a clockwise direction looking from in front of the transmission, the internal gear 6 during this time being held from counter clockwise rotation, looking from in front of the transmission, by the roller one-way brake mechanism 32. The drive section 41 of the fluid coupling 4 rotates with the front external cone clutch member 13 and, as the speed of the drive shaft 1 increases, the liquid in the drive section is forced into the driven section 42 of the fluid coupling to compel the latter to rotate. As the force exerted by the liquid increases the speed of rotation of the driven section increases and finally the liquid travels circumferentially in the torus of the fluid coupling generating a centrifugal force of its own to overcome the resistance to rearward axial movement of the driven section which latter is then moved axially rearwardly and away from the drive section and gradually moves the rear external cone clutch member 49 axially rearwardly from its inoperative position to its operative position. This rear external cone clutch member then rotates the rear internal cone clutch member 33 and at a progressively increasing rate as the rate of rotation of the driven section of the fluid coupling increases until all of the parts are rotating as a unit at which time the internal gear 6 is rotating at the same rate as the sun gear 5 and the driven shaft 2 is rotating at the same rate as the drive shaft 1.

By reason of the roller clutch mechanisms 65 and 70 the driven shaft 2 cannot overrun the drive shaft 1 so that the means for rotating the drive shaft can function as a brake for the driven shaft. Also by reason of the clutch construction between the drive shaft and the driven shaft no appreciable driving effort is exerted on the driven shaft by the drive shaft when the latter is rotating at low or idling speed. Further by reason of the clutch construction between the driven section of the fluid coupling and the planetary gearing no appreciable resistance or drag is exerted by the driven section upon the driven shaft when the latter is being driven at low speed.

While the drive shaft 1 may be driven through a clutch, it may also be driven directly, in which case, it is desirable to provide means which may be manually controlled to connect the driven shaft to another shaft such as the propeller shaft of a motor vehicle. As shown in the present instance, 80 is a manually operable clutch member movable axially forwardly to clutch the driven shaft 2 to the shaft 81 and also movable axially rearwardly to clutch the driven shaft 2 through reverse gearing to the shaft 81.

What I claim as my invention is:

A transmission comprising a drive shaft rotatable in one direction, a driven shaft, epicyclic gearing having external and internal gears and a planetary gear meshing with said external and internal gears and operatively connected to said driven shaft, a fluid coupling comprising opposed drive and driven sections, a clutch member connected to one of said external and internal gears, a second axially movable clutch member cooperative with said first mentioned clutch member and carrying said drive section, means operable by said drive shaft for rotating and axially moving said cooperating clutch member in frictional engagement with said first mentioned clutch member, a third clutch member connected to the other of said external and internal gears, a fourth clutch member cooperative with said third clutch member and carrying said driven section and rotatable and axially movable by said driven section into frictional engagement with said third clutch member, and means for holding said third clutch member from rotation in a direction opposite that of said drive shaft.

BRONISLAUS T. MALACHOWSKI.

REFERENCES CITED

The following references are of record in the file of this patent:

UNITED STATES PATENTS

| Number | Name | Date |
| --- | --- | --- |
| 2,015,300 | Dell et al. | Sept. 24, 1935 |
| 2,055,300 | Maurer | Sept. 22, 1936 |
| 2,112,016 | Dell et al. | Mar. 22, 1938 |
| 2,238,748 | Patterson | Apr. 15, 1941 |
| 2,298,649 | Russell | Oct. 13, 1942 |
| 2,301,451 | Pollard | Nov. 10, 1942 |
| 2,388,062 | Keller | Oct. 30, 1945 |
| 2,410,921 | Avila | Nov. 12, 1946 |
| 2,421,190 | Dodge | May 27, 1947 |